United States Patent [19]

Schumacher

[11] Patent Number: 5,023,592

[45] Date of Patent: Jun. 11, 1991

[54] TURN SIGNAL ACTUATOR FOR MOTOR VEHICLE HAND CONTROLS

[76] Inventor: Larry L. Schumacher, 18876 Tenderfort Trail, Newhall, Calif. 91321

[21] Appl. No.: 552,312

[22] Filed: Jul. 13, 1990

[51] Int. Cl.⁵ .................... B60Q 1/34; H01H 9/00
[52] U.S. Cl. .................... 340/475; 340/465; 340/825.19; 200/61.27; 200/61.54; 200/61.85; 200/61.89; 116/35 R; 434/112
[58] Field of Search ............ 340/475, 476, 477, 407, 340/465–467, 825.19; 434/112; 200/157, 61.29, 61.27, 61.85–61.89, 61.54; 116/35 R, 35 A

[56] References Cited

U.S. PATENT DOCUMENTS 4,180,713 12/1979 Gonzales .................... 200/61.27
4,677,932 7/1987 Ewing .................... 200/61.27

Primary Examiner—Donnie L. Crosland

[57] ABSTRACT

The turn signal actuator for motor vehicles consists of thumb actuated switches attached to the hand control accelerator-brake control grip and signal arm actuators attached to the steering column. The thumb actuated switches are used by the vehicle driver to activate the signal arm actuators rotating the turn signal arm clockwise for right turns or rotating the turn signal arm counterclockwise for left turns. Because the thumb actuated switches are attached to the hand control accelerator-brake control grip, they are used to signal vehicle turns with momentary thumb pressure without releasing or changing the settings of the hand control accelerator-brake control grip.

3 Claims, 2 Drawing Sheets

TURN SIGNAL ACTUATOR FOR MOTOR VEHICLE HAND CONTROLS

BACKGROUND OF THE INVENTION

1. Field of the Invention

This invention pertains to devices assisting persons using motor vehicle hand controls to actuate turn signals.

2. Description of Prior Art

Motor vehicle hand controls are used by vehicle operators that do not have the use of their legs to control the vehicle accelerator and brake pedals. One of motor vehicle operator's hands controls the steering wheel and the other hand simultaneously controls the accelerator pedal, the brake pedal and turn signals.

The turn signal switch arm is attached to the steering column and must be actuated by the operator's hand controlling the single hand control grip that determines the accelerator and brake pedal settings. While driving, when the accelerator pedal and or brake pedal are depressed, it is difficult for the driver to reach the turn signal switch arm without unsafely releasing the accelerator-brake grip or changing the settings of the accelerator pedal or brake pedal.

Accordingly, the object of this invention is to enable the turn signal switch arm to be actuated by the hand controlling the accelerator and brake pedals from any pedal setting without releasing the accelerator-brake grip or changing the pedals settings.

SUMMARY OF THE INVENTION

The turn signal is a three position electrical switch mechanically actuated by a turn signal arm rotating relative to the motor vehicle steering column. The center switch arm position signals no turn, rotating the switch arm clockwise signals a right turn and rotating the switch arm counter clockwise signals a left turn.

The turn signal actuator consists of thumb actuated switches and a signal arm actuator. The thumb actuated switches are attached to the hand control accelerator-brake control grip. The thumb actuated switches activates the signal arm actuator either to rotate the turn signal arm clockwise for right turns or to rotate the turn signal arm counterclockwise for left turns. Since the thumb actuated switches are attached to the hand control accelerator-brake control grip, they can be used to signal vehicle turns with momentary thumb pressure from any accelerator or brake position without releasing the hand control accelerator-brake control grip or changing the accelerator or brake settings.

DESCRIPTION OF THE PREFERRED EMBODIMENT

Figure 1:
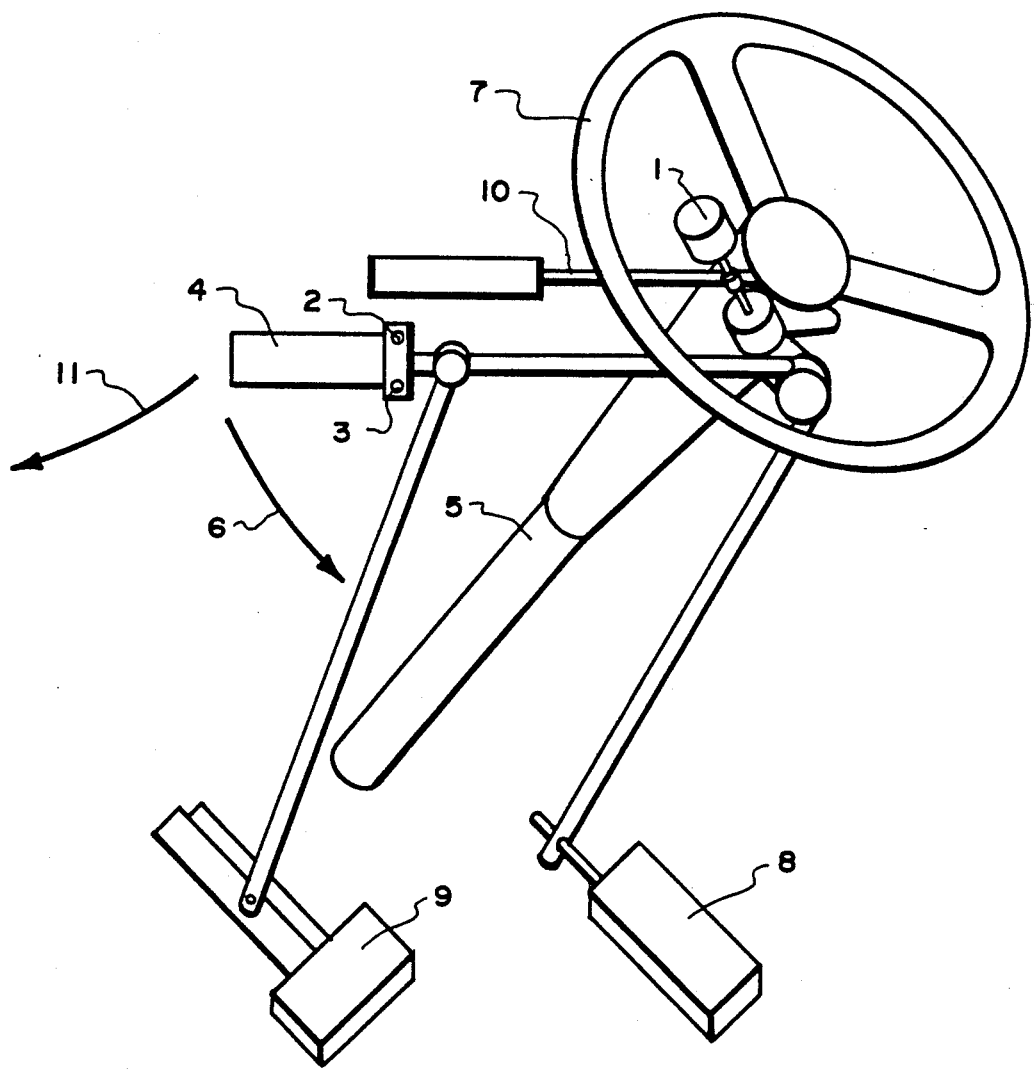
FIG. 1 illustrates a motor vehicle steering column with an attached turn signal signal actuator for motor vehicle hand controls.

FIG. 1 illustrates the turn signal actuator consists of a signal arm actuator 1 and thumb actuated left turn signal switch 2 and right turn signal switch 3 attached to hand control accelerator-brake control grip 4. Hand control grip 4 is rotationally attached to the vehicle steering column 5 so that grip 4 rotation 6 in the approximate plane of steering wheel 7 results in movement of vehicle accelerator pedal 8. Grip 4 rotation 11 approximately orthogonal to the plane of steering wheeel 7 results in movement of brake pedal 9.

The position of turn signal arm 10 is controlled by the vehicle driver's hand or by thumb actuated switches 2,3 and the signal arm actuator 1. Rotating arm 10 clockwise around steering column 5 signals a vehicle right turn and rotating arm 10 counterclockwise around steering column 5 signals a left turn. After a turn is completed, the turn signal switch automatically returns to the center off position.

Figure 2:
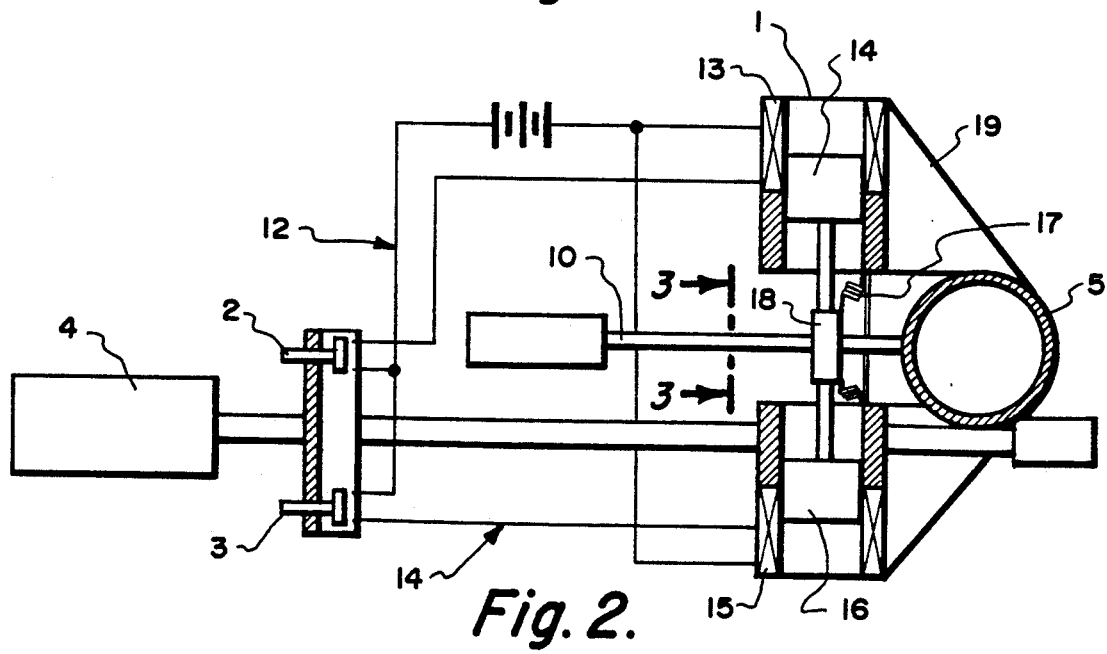
FIG. 2 illustrates a section view of the preferred embodiment of the turn signal signal actuator for motor vehicle hand controls.

FIG. 2 is a detailed section view (schematically shown) of the preferred embodiment of a turn signal actuator for motor vehicle hand controls illustrating that depressing thumb actuated electrical turn signal switch 2, attached to hand control accelerator-brake control grip 4, closes electrical circuit 12 including solenoid coil 13. When switch 2 is closed solenoid plunger 14 is drawn into coil 13 rotating turn signal switch arm 10 clockwise signaling a right turn. Depressing thumb actuated electrical turn signal switch 3 closes electrical circuit 14 including solenoid coil 15. When switch 3 is closed, solenoid plunger 16 is drawn into coil 15 rotating turn signal switch arm 10 counterclockwise signaling a left turn.

Figure 3:
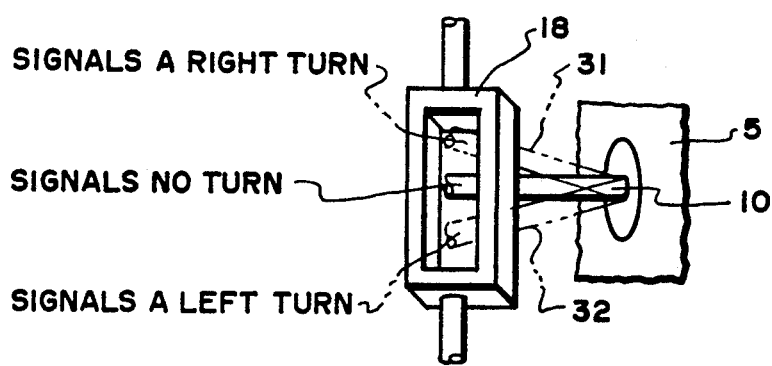
FIG. 3 illustrates the linkage between the vehicle turn signal arm and the turn signal signal actuator for motor vehicle hand controls.

Bracket 19 supports electrical signal arm actuator 1 attached to steering column 5. Springs 17 assure that plungers 14,16 return to a position that does not apply any force to switch arm 10 when switches 2,3 are not depressed. Linkage structure 18 links solenoid plungers 14,16 to signal arm 10 such that vehicle turns can be signaled by the vehicle operator using signal arm 10 without moving linkage 18 or plungers 14,16 as illustrated in FIG. 3.

Figure 4:
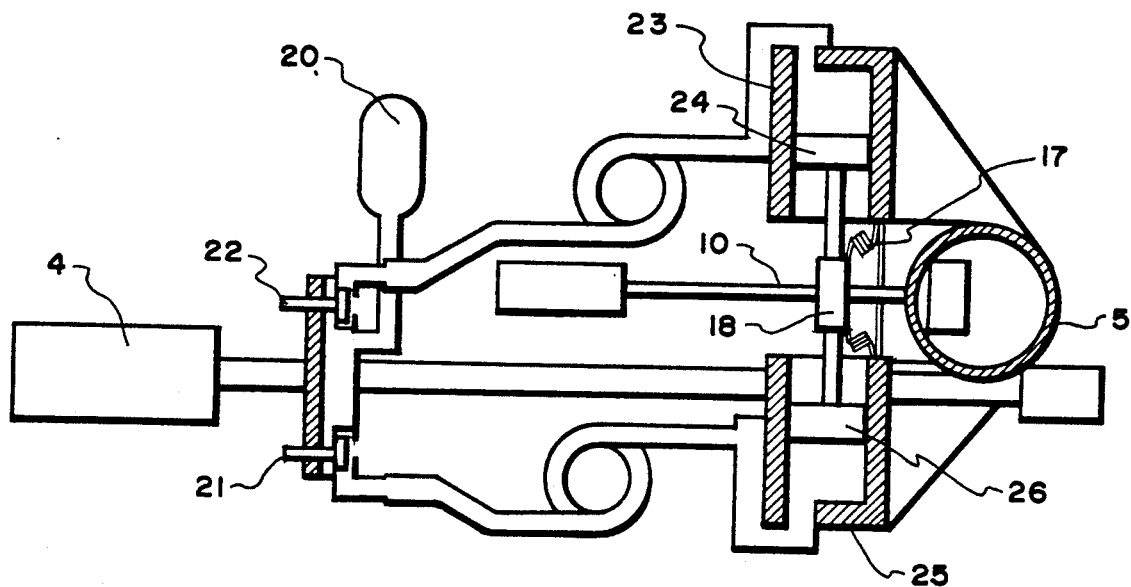
FIG. 4 illustrates a section view of an alternate embodiment of the turn signal signal actuatoar for motor vehicle hand controls.

FIG. 4 is a detailed section view of an alternate embodiment of a turn signal actuator for motor vehicle hand controls illustrating that depressing thumb actuated right turn vacuum switch 22, attached to hand control accelerator-brake control grip 4, enables vacuum from vacuum supply 20 to the interior space of cylinder 23 drawing piston 24 into cylinder 23 rotating turn signal switch arm 10 clockwise signaling a right turn. Depressing thumb actuated left turn vacuum switch 21, attached to hand control accelerator-brake control grip 4, enables vacuum from vacuum supply 20 to the interior space of cylinder 25 drawing piston 26 into cylinder 25 rotating turn signal switch arm 10 counterclockwise signaling a left turn.

What is claimed is:

1. An apparatus for electrically controlling a motor vehicle turn signal arm from a hand control accelerator-brake grip comprising:
    an electrical signal arm actuator attached to a motor vehicle steering column being used to rotate the motor vehicle turn signal arm;
    an electrical left turn signal switch attached to the hand control accelerator-brake grip and linked by an electrical circuit to the electrical signal arm actuator, the electrical left turn signal switch being used to actuate the electrical signal arm actuator signaling a motor vehicle left turn;

an electrical right turn signal switch attached to the hand control accelerator-brake grip and linked by an electrical circuit to the electrical signal arm actuator, the electrical right turn signal switch being used to actuate the electrical signal arm actuator signaling a motor vehicle right turn;

a linkage structure attaching the electrical signal arm actuator to the motor vehicle turn signal arm, the linkage structure rotating the turn signal arm in response to the electrical signal actuator while permitting a motor vehicle operator to rotate the motor vehicle turn signal arm without interference from the electric signal arm actuator.

2. An apparatus for using a motor vehicle's vacuum to control a motor vehicle turn signal arm from a hand control accelerator-brake grip comprising:

a vacuum signal arm actuator attached to a motor vehicle steering column to rotate the motor vehicle turn signal arm;

a vacuum left turn signal switch attached to the hand control accelerator-brake grip and linked by vacuum hose from a vacuum source to the vacuum signal arm actuator, the vacuum left turn signal switch being used to actuate the vacuum signal arm actuator signaling a motor vehicle left turn;

a vacuum right turn signal switch attached to the hand control accelerator-brake grip and linked by vacuum hose from the vacuum source to the vacuum signal arm actuator, the vacuum right turn signal switch being used to actuate the vacuum signal arm actuator signaling a motor vehicle right turn;

a linkage structure attaching the vacuum signal arm actuator to the motor vehicle turn signal arm, the linkage structure rotating the turn signal arm in response to the vacuum signal actuator while permitting a motor vehicle operator to rotate the motor vehicle turn signal arm without interference from the vacuum signal arm actuator.

3. An apparatus to signal a vehicle turn from a hand control accelerator-brake grip comprising:

a signal arm actuator attached to a motor vehicle steering column to rotate the motor vehicle turn signal arm;

turn signal switches attached to the hand control accelerator-brake grip being used to actuate the signal arm actuator signaling a motor vehicle turn;

a linkage structure attaching the signal arm actuator to the motor vehicle turn signal arm, the linkage structure rotating the turn signal arm in response to the signal actuator while permitting a motor vehicle operator to manually rotate the motor vehicle turn signal arm without interference from the signal arm actuator.

* * * * *